(12) United States Patent
Kato et al.

(10) Patent No.: US 7,385,493 B2
(45) Date of Patent: Jun. 10, 2008

(54) TIRE INFLATION PRESSURE DETECTION APPARATUS

(75) Inventors: Manabu Kato, Nagoya (JP); Eiji Fujioka, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 322 days.

(21) Appl. No.: 11/334,370

(22) Filed: Jan. 19, 2006

(65) Prior Publication Data
US 2006/0170539 A1    Aug. 3, 2006

(30) Foreign Application Priority Data
Jan. 28, 2005  (JP)  ............ 2005-020520

(51) Int. Cl.
B60C 23/00  (2006.01)
G05B 11/01  (2006.01)
(52) U.S. Cl. ............ 340/442; 340/444; 340/445; 340/447; 340/310.13; 73/146.5
(58) Field of Classification Search ........... 340/442
See application file for complete search history.

(56) References Cited
U.S. PATENT DOCUMENTS
7,248,953 B2 * 7/2007 Ogawa ............ 701/29

2004/0150516 A1 * 8/2004 Faetanini ............ 340/444

FOREIGN PATENT DOCUMENTS
JP    10-309914    11/1998

* cited by examiner

*Primary Examiner*—Donnie L. Crosland
(74) *Attorney, Agent, or Firm*—Sughrue Mion, PLLC

(57) ABSTRACT

A tire inflation pressure detection apparatus includes a detection portion provided in a tire of a vehicle for detecting a tire inflation pressure, a transmitting portion for wirelessly transmitting a signal of a tire inflation pressure information, a receiving portion for feeding the signal transmitted from the transmitting portion, a wheel speed sensor for detecting a rotational speed of a wheel of the tire, a control portion for feeding a signal from the wheel speed sensor and the signal from the receiving portion, an electric power source wire for connecting the wheel speed sensor to the control portion, a signal input wire for connecting the electric power source wire to the receiving portion, and a filter disposed at the electric power source wire between a connection point with the signal input wire and the control portion for blocking the signal transmitted from the transmitting portion.

6 Claims, 1 Drawing Sheet

TIRE INFLATION PRESSURE DETECTION APPARATUS

CROSS REFERENCE TO RELATED APPLICATIONS

This application is based on and claims priority under 35 U.S.C. § 119 to Japanese Patent Application 2005-020520, filed on Jan. 28, 2005, the entire content of which is incorporated herein by reference.

FIELD OF THE INVENTION

This invention relates to a tire inflation pressure detection apparatus.

BACKGROUND

A conventional tire inflation pressure monitoring system for a vehicle is known in which items of information from a tire inflation pressure sensor for monitoring a tire inflation pressure are wirelessly transmitted from a transmitting portion provided at a tire or a wheel to a receiving portion provided at a vehicle side. Generally, weak electromagnetic wave is utilized in such a tire inflation pressure monitoring system because such electromagnetic wave can be utilized without a license application. Accordingly, a highly sensitive receiving antenna would be required. Then, for ensuring sufficient level of received signals, a larger antenna needs to be provided. For avoiding use of such a larger antenna, a signal wire of a wheel speed sensor is utilized as a receiving antenna according to techniques described in JPH10-309914A (document 1). As a result, a receiving antenna for receiving signals from the tire inflation pressure sensor is not in need of being provided near a wheel. Accordingly, wiring can be abolished from the receiving antenna to a control apparatus such as an electronic control unit (ECU).

However, in the techniques according to document 1, because the signal wire of the wheel speed sensor is utilized as the receiving antenna of the tire inflation pressure monitoring system, and the signal wire is generally not shielded, a signal to noise ratio (S/N ratio) of received signals tends to be decreased when the signal wire is utilized as the receiving antenna. As a result, receive of necessary signals of the tire inflation pressure sensor would be difficult. If, for compensating this, the signal wire is shielded in order for improving the S/N ratio, entire of long signal wire needs to be shielded from near the wheel to the control apparatus provided in an engine room or a cabin. Such configuration would cause increase of costs.

A need thus exists for a tire inflation pressure detection apparatus which can stably receive signals of a tire inflation pressure, and which is low in cost. The present invention has been made in view of the above circumstances and provides such a tire inflation pressure detection apparatus.

SUMMARY OF THE INVENTION

According to an aspect of the present invention, a tire inflation pressure detection apparatus includes a detection portion provided in a tire of a vehicle for detecting a tire inflation pressure, a transmitting portion for wirelessly transmitting a signal of the tire inflation pressure information detected by the detection portion, a receiving portion for feeding the signal transmitted from the transmitting portion, a wheel speed sensor for detecting a rotational speed of a wheel of the tire, a control portion for feeding a signal of a wheel speed information from the wheel speed sensor and the signal of the tire inflation pressure information from the receiving portion, an electric power source wire for connecting the wheel speed sensor to the control portion, which is utilized as a receiving antenna of the receiving potion, a signal input wire for connecting the electric power source wire to the receiving portion, a first filter disposed at the signal input wire for transmitting the signal transmitted from the transmitting portion and for blocking a low frequency which includes direct current or an unnecessary high frequency, and a second filter disposed at the electric power source wire between a connection point with the signal input wire and the control portion for blocking the signal transmitted from the transmitting portion.

According to a further aspect of the present invention, a tire inflation pressure apparatus includes a detection portion provided in a tire of a vehicle for detecting a tire inflation pressure, a transmitting portion for wirelessly transmitting a signal of the tire inflation pressure information detected by the detection portion, a receiving portion for feeding the signal transmitted from the transmitting portion, a wheel speed sensor for detecting a rotational speed of a wheel of the tire, a control portion for feeding a signal of a wheel speed information from the wheel speed sensor and the signal of the tire inflation pressure information from the receiving portion, an electric power source wire for connecting the wheel speed sensor to the control portion, which is utilized as a receiving antenna of the receiving portion, a signal input wire for connecting the electric power source wire to the receiving portion, and a filter disposed at the electric power source wire between a connection point with the signal input wire and the control portion for blocking the signal transmitted from the transmitting portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
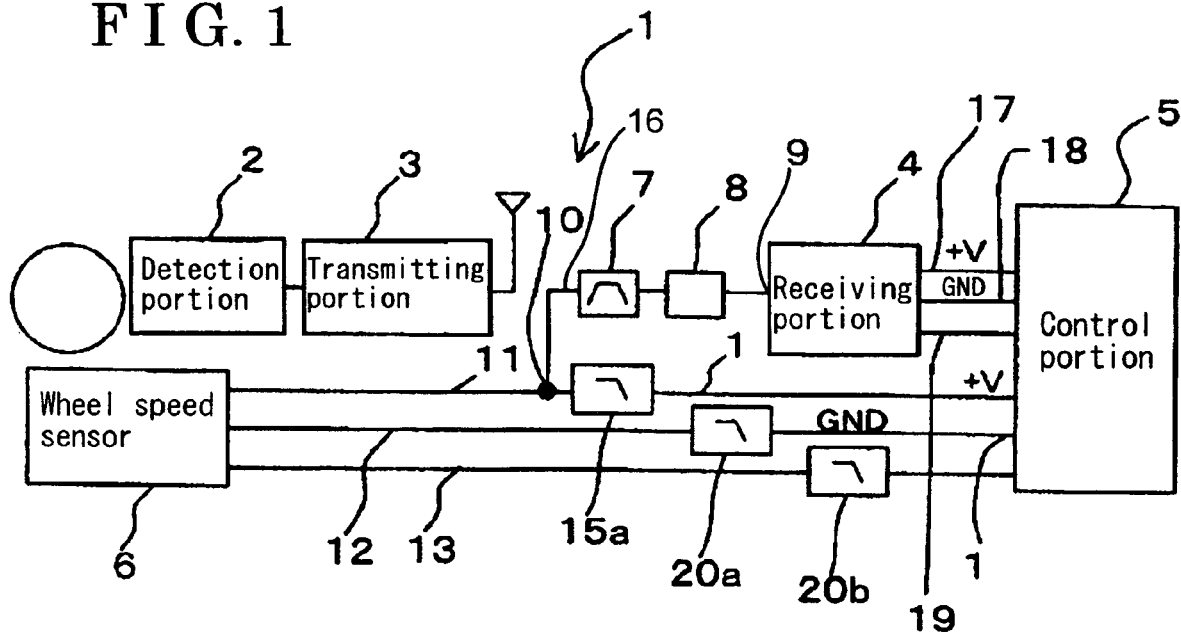
FIG. 1 represents a schematic view illustrating a tire inflation pressure detection apparatus.

An embodiment of the present invention will be explained with reference to drawing figures. A tire inflation pressure detection apparatus 1 for detecting a tire inflation pressure (air pressure in a tire of a vehicle) includes a detection portion 2 provided in the tire of the vehicle for detecting the tire inflation pressure, a transmitting portion 3 for wirelessly transmitting a signal of a tire inflation pressure information detected by the detection portion 2, a receiving portion 4 for feeding the signal transmitted from the transmitting portion 3, a wheel speed sensor 6 for detecting a rotational speed of the wheel, and a control portion 5 for feeding a signal of a wheel speed information and the signal of the tire inflation pressure information. The receiving portion 4 transmits a signal to the control portion 5 on the basis of the fed signal of the tire inflation pressure information.

The wheel speed sensor 6 is provided near the receiving portion 4 of the tire inflation pressure detection apparatus 1 provided in the tire. The wheel speed sensor 6 generates signals such as pulse train of which frequency is proportional to a rotational speed of the wheel. An electric power source wire 11 (+V), a ground wire 12 (GND wire), and a wheel speed signal wire 13 for transmitting a sensor output signal from the wheel speed sensor 6 connect the wheel speed sensor 6 to the control portion 5. The electric power source wire 11 is connected to the wheel speed sensor 6 in order for supplying electricity to the wheel speed sensor 6. Then, the electric power source wire 11 is connected to a received signal wire 16 (signal input wire) through a connection point 10. The received signal wire 16 is connected to a signal input terminal 9 serving as a radio frequency (RF) input terminal.

The electric power source wire 11 also functions as an antenna wire for receiving the signal of the tire inflation pressure information transmitted from the transmitting portion 3. In the received signal wire 16, a filter 7 is provided. The filter 7 has a function as a bandpass filter for transmitting a high frequency signal of the transmitted tire inflation pressure information, and for blocking a low frequency signal including direct current and unnecessary high frequency signal. The filter 7 can be configured in a simple manner with use of a capacitor which transmits a predetermined frequency. One control apparatus 5 can be provided near each wheel speed sensor 6 of the vehicle. Alternatively, one control apparatus 5 can be provided for integrally controlling plural wheel speed sensors 6.

An electric power source wire 17 (+V), a ground wire 18 (GND wire), and an output signal wire 19 connect the receiving portion 4 to the control portion 5. The output signal wire 19 serves as a signal wire for transmitting the signal from the receiving portion 4 to the control portion 5. The receiving portion 4 can convert a carrier wave frequency of the signal into a low frequency by means of mixer, and can transmit the converted low frequency signal. In this case, a circuit for demodulating the signal of the tire inflation pressure information fed by the receiving portion 4 can be provided in the control portion 5. If the converted low frequency signal has a medium frequency, which is generally utilized by a frequency modulation (FM) receiver or an amplitude modulation (AM) receiver, such as 10.7 MHz or 455 kHz, a resonator for local oscillation utilized in the receiving portion 4 and a filter for low frequency becomes easily available.

Items of information about a state of inside the tire of the vehicle transmitted from the transmitting portion 3 are not limited to the tire inflation pressure. The items of information about a state of inside the tire can include a state of acceleration caused by centrifugal force generated by the rotation of the tire, a temperature of air inside the tire, a temperature on a surface of the tire, a voltage of a battery serving as an electric power source of the transmitting portion 3, or the like. An analog signal itself or a converted digital signal of such items of information detected by the detection portion 2 is converted to a high frequency signal having a desired carrier wave frequency by means of modulation such as a frequency modulation, an amplitude modulation, and a phase modulation. Then, the modulated signal is wirelessly transmitted through an antenna (not illustrated).

In the electric power source wire 11 of the wheel speed sensor 6, a filter 15a is provided between the connection point 10 and the control portion 5 in order for blocking noises coming from the control portion 5 side of the electric power source wire 11. In the ground wire 12 (GND wire) and the wheel speed signal wire 13, filters 20a and 20b are respectively provided also for blocking noises coming from the control portion 5 side of the ground wire 12 or the wheel speed signal wire 13 respectively. As described above, when the electric power source wire 11 of the wheel speed signal sensor 6 is utilized as a receiving antenna of the receiving portion 4 of the tire inflation pressure detection apparatus 1, noises entering into the wheel speed signal wire 13 between the filter 20b and the control portion 5 can be blocked.

Figure 2:
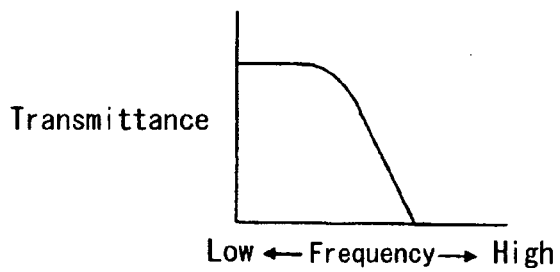
FIG. 2 represents a schematic diagram illustrating a frequency characteristics of a second filter.

FIG. 2 represents an example of a property of the filter 15a utilized in the embodiment of the present invention. As can be seen from FIG. 2, the filter 15 transmits low frequency signals and blocks high frequency signals. The signal of the tire inflation pressure information transmitted from the transmitting portion 3 is superposed on an electric power source current flowing in the electric power source wire 11, in which the filter 15a is provided. The frequency of the signal of the tire inflation pressure information is higher than that of the signal of the wheel speed information transmitted from the wheel speed sensor 6. Accordingly, the filter 15a does not allow the signals of the tire inflation pressure information to transmit and blocks the same. Therefore, the electric power source wire 11 of the vehicle speed sensor 6 does not lose a function for transmitting a detected value from the wheel speed sensor 6, and can selectively transmit the signal of several tens kHz or less frequency corresponding to a predetermined frequency for the signal of the wheel speed information. Incidentally, the reason why the filters 20a and 20b are disposed at the ground wire 12 (GND wire) and the wheel speed signal wire 13 respectively is to reduce influence to the receiving portion 4 from noises entering into the ground wire 12 and the wheel speed signal wire 13 connected to the control portion 5. As described above, the signal of the tire inflation pressure information can be inhibited from transmitting to the control portion 5 through the electric power source 11.

Then, the filters 20a and 20b are disposed at the ground wire 12 and the wheel speed signal wire 13 of the wheel speed sensor 6 respectively. Accordingly, the signal of the tire inflation pressure information can be inhibited from transmitting to the control portion 5, and the signal of the wheel speed information from the wheel speed sensor 6 can be normally transmitted. Further, unnecessary noise signals inversely transmitted through the electric power source wire 11 or the ground wire 12, each wire connecting the control portion 5 and the wheel speed sensor 6, can be inhibited from mixing into the signal input terminal 9 through the received signal wire 16.

Figure 3:
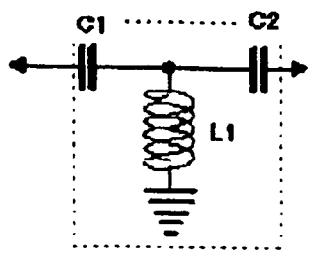
FIG. 3 represents a diagram illustrating an example of a matching circuit.
Figure 4:
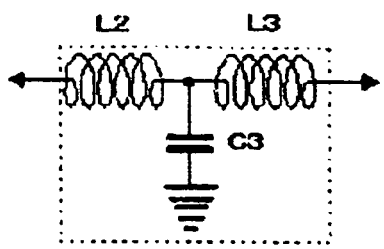
FIG. 4 represents a diagram illustrating another example of the matching circuit.

FIG. 3 and FIG. 4 represent diagrams illustrating examples of a matching circuit 8 illustrated in FIG. 1. The matching circuit 8 is disposed at the received signal wire 16 branched from the connection point 10 with the electric power source wire 11, and connected to the filter 7. In the matching circuit 8, serially connected capacitors C1, C2 are provided and connected to the receiving portion 4. Then, an inductor L1 connects a wire between the capacitors C1 and C2 and the ground of the circuit. When the filter 7 includes a capacitor, the capacitor C1 can be considered to have a combined capacitance C1' of the filter 7 and the capacitor C1. In addition, for example, if an absolute value of an impedance of the capacitor C2 is equal to or less than one tenth of an absolute value of an input impedance of the signal input terminal 9 of the receiving portion 4 at a frequency of the carrier wave of the signal transmitted to the signal input portion 9, and thus the capacitor C2 is sufficiently large and the signal input terminal 9 can be connected to a constant voltage such as ground in serial-flow relationship with low impedance, the capacitor C2 becomes dispensable. In FIG. 3, the inductor L1 is connected to the ground. However, if a reference voltage is set in the circuit, the inductor L1 can be connected to the reference voltage. Further, as illustrated in FIG. 4, the matching circuit 8 can be configured mainly from inductors L2 and L3.

An electric power source wire 17 (+V), A ground wire 18 (GND wire) of the receiving portion 4 can be common to the electric power source wire 11 and the ground wire 12 (GND wire) of the wheel speed sensor 6. In this case, the electric power source wire 17 can be connected to the electric power source wire 11 between the filter 15a and the control portion 5. Further, the ground wire 18 can be connected to the ground wire 12 between the filter 20a and the control portion 5. Incidentally, when the electric power source wire and the ground wire are commonly utilized with the receiving portion 4, it is preferable that the wires connected to the receiving portion are as short as possible. In addition, when the ground wire 12 of the wheel speed sensor 6 is utilized as a receiving antenna instead of the electric power source wire 11, the received signal wire 16 can be connected to the ground wire 12 between the wheel speed sensor 6 and the filter 20a. Further, similarly, the receiving antenna is not limited to a wire for the wheel speed sensor 6. An electric power source wire, a ground wire, or a signal wire of another sensor provided near the receiving portion 4 of the tire inflation pressure detection apparatus 1 can be utilized as a receiving antenna.

According to a first aspect of the present invention, a tire inflation pressure detection apparatus includes a detection portion provided in a tire of a vehicle for detecting a tire inflation pressure, a transmitting portion for wirelessly transmitting a signal of the tire inflation pressure information detected by the detection portion, a receiving portion for feeding the signal transmitted from the transmitting portion, a wheel speed sensor for detecting a rotational speed of a wheel, a control portion for feeding a signal of a wheel speed information from the wheel speed sensor and the signal of the tire inflation pressure information from the receiving portion, an electric power source wire for connecting the wheel speed sensor to the control portion, which is utilized as a receiving antenna of the receiving portion, a signal input wire for connecting the electric power source wire to the receiving portion, a first filter disposed at the signal input wire for transmitting the signal transmitted from the transmitting portion and for blocking a low frequency which includes direct current or an unnecessary high frequency, and a second filter disposed at the electric power source wire between a connection point with the signal input wire and the control portion for blocking the signal transmitted from the transmitting portion.

According to a second aspect of the present invention, the tire inflation pressure detection apparatus further includes a ground wire for connecting the wheel speed sensor to the control portion, a wheel speed signal wire for connecting the wheel speed sensor to the control portion for transmitting the signal of the wheel speed information transmitted from the wheel speed sensor to the control portion, and a third filter disposed at the wheel speed signal wire or the ground wire for blocking the signal transmitted from the transmitting portion and for transmitting the signal of the wheel speed information transmitted from the wheel speed sensor.

According to a third aspect of the present invention, in the tire inflation pressure detection apparatus, a matching circuit is provided in the signal input wire between the first filter and the receiving portion.

According to the first aspect of the present invention, the signal input terminal of the receiving portion of the tire inflation pressure detection apparatus is connected to the electric power source wire which connects the wheel speed sensor for detecting the wheel speed and the control portion. Then, the first filter for transmitting the signal transmitted from the transmitting portion and for blocking a low frequency which includes direct current or an unnecessary high frequency is disposed at the signal input wire. Further, the second filter is disposed at the electric power source wire of the sensor between the connection point with the signal input wire and the control portion. The second filter functions so that the signals from the transmitting portion are not transmitted. Thus, the electric power source wire of the wheel speed sensor can function as a receiving antenna of the receiving portion, and the signals transmitted from the transmitting portion can be inhibited from transmitting in the extension from the connection point seen from the wheel speed sensor.

According to the second aspect of the present invention, the third filter is disposed at the wheel speed signal wire or the ground wire connected to the wheel speed sensor for blocking the signals transmitted from the transmitting portion and for transmitting the signals from the wheel speed sensor. The third filter allows transmission of the signal from the wheel speed sensor and inhibits transmission of noises coming from opposite side of the third filter and being transmitted in an opposite direction of a transmission direction of the signal from the wheel speed sensor. As a result, noises, which enter into the signal input wire caused by cross talks of the electric power source wire of the wheel speed sensor with the ground wire or the wheel speed signal wire, can be inhibited. Accordingly, deterioration of S/N ratio can be reduced.

According to the third aspect of the present invention, the matching circuit is provided in the signal input wire between the first filter and the receiving portion. The matching circuit matches impedance of the transmitted signal transmitted from the transmitting portion and transmitted through the first filter with that of the receiving portion. Accordingly, signal loss during transmission can be inhibited and efficient signal transmission is enabled.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A tire inflation pressure detection apparatus, comprising:
   a detection portion provided in a tire of a vehicle for detecting a tire inflation pressure;
   a transmitting portion for wirelessly transmitting a signal of the tire inflation pressure information detected by the detection portion;
   a receiving portion for feeding the signal transmitted from the transmitting portion;
   a wheel speed sensor for detecting a rotational speed of a wheel of the tire;

a control portion for feeding a signal of a wheel speed information from the wheel speed sensor and the signal of the tire inflation pressure information from the receiving portion;

an electric power source wire for connecting the wheel speed sensor to the control portion, which is utilized as a receiving antenna of the receiving portion;

a signal input wire for connecting the electric power source wire to the receiving portion;

a first filter disposed at the signal input wire for transmitting the signal transmitted from the transmitting portion and for blocking a low frequency which includes direct current or an unnecessary high frequency; and a second filter disposed at the electric power source wire between a connection point with the signal input wire and the control portion for blocking the signal transmitted from the transmitting portion.

2. The tire inflation pressure detection apparatus according to claim 1, further comprising:

a ground wire for connecting the wheel speed sensor to the control portion;

a wheel speed signal wire for connecting the wheel speed sensor to the control portion for transmitting the signal of the wheel speed information transmitted from the wheel speed sensor to the control portion; and a third filter disposed at the wheel speed signal wire or the ground wire for blocking the signal transmitted from the transmitting portion and for transmitting the signal of the wheel speed information transmitted from the wheel speed sensor.

3. The tire inflation pressure detection apparatus according to claim 1, wherein a matching circuit is provided in the signal input wire between the first filter and the receiving portion.

4. The tire inflation pressure detection apparatus according to claim 3, wherein the matching circuit includes a first condenser and a second condenser provided in series between the first filter and the receiving portion and an inductor provided in a wire branched from between the first condenser and the second condenser and connected to a ground or a reference voltage.

5. The tire inflation pressure detection apparatus according to claim 3, wherein the matching circuit includes a first inductor and a second inductor provided in series between the first filter and the receiving portion and a condenser provided in a wire branched from between the first inductor and the second inductor and connected to a ground or a reference voltage.

6. A tire inflation pressure detection apparatus, comprising:

a detection portion provided in a tire of a vehicle for detecting a tire inflation pressure;

a transmitting portion for wirelessly transmitting a signal of the tire inflation pressure information detected by the detection portion;

a receiving portion for feeding the signal transmitted from the transmitting portion;

a wheel speed sensor for detecting a rotational speed of a wheel of the tire;

a control portion for feeding a signal of a wheel speed information from the wheel speed sensor and the signal of the tire inflation pressure information from the receiving portion;

an electric power source wire for connecting the wheel speed sensor to the control portion, which is utilized as a receiving antenna of the receiving portion;

a signal input wire for connecting the electric power source wire to the receiving portion; and a filter disposed at the electric power source wire between a connection point with the signal input wire and the control portion for blocking the signal transmitted from the transmitting portion.

* * * * *